United States Patent
Duttenhöfer et al.

(10) Patent No.: US 10,295,090 B2
(45) Date of Patent: May 21, 2019

(54) WINDING MANDREL IN A WINDING APPARATUS FOR PRODUCING A LINER HOSE FOR LINING CHANNELS AND PIPES

(71) Applicant: Brandenburger Patentverwertung GbR, Landau (DE)

(72) Inventors: Peter Duttenhöfer, Ilbesheim (DE); Timo Singler, Ellerstadt (DE)

(73) Assignee: Brandenburger Patentverwetung GbR, Landau (DE)

( * ) Notice: Subject to any disclaimer, the term of this patent is extended or adjusted under 35 U.S.C. 154(b) by 216 days.

(21) Appl. No.: 15/346,897

(22) Filed: Nov. 9, 2016

(65) Prior Publication Data

US 2017/0138512 A1 May 18, 2017

(30) Foreign Application Priority Data

Nov. 17, 2015 (DE) .................. 10 2015 014 729

(51) Int. Cl.
*B29C 63/06* (2006.01)
*F16L 11/08* (2006.01)
(Continued)

(52) U.S. Cl.
CPC .......... *F16L 11/081* (2013.01); *B29C 33/444* (2013.01); *B29C 63/065* (2013.01);
(Continued)

(58) Field of Classification Search
CPC ... B29C 63/065; B29C 66/5326; B29C 66/81; B29C 66/83; B29C 66/922; B29C 53/607; B29C 63/10; F16L 11/081
See application file for complete search history.

(56) References Cited

U.S. PATENT DOCUMENTS 2,912,043 A * 11/1959 Lindbergh .............. B29C 53/36
156/201
3,570,749 A 3/1971 Sato
(Continued)

FOREIGN PATENT DOCUMENTS

DE 19823714 C2 7/2000
GB 802713 A * 10/1958 ......... B29C 33/0011

OTHER PUBLICATIONS

EPO Search Report dated May 11, 2017.
DE 19823714 C2 machine translation.

*Primary Examiner* — Emmanuel M Marcelo
(74) *Attorney, Agent, or Firm* — Melgar IP Law PLLC; Tod M. Melgar

(57) ABSTRACT

A winding mandrel (1) in a winding apparatus for producing a liner hose (2) for the lining of channels and pipelines, which comprises an inner film hose (4) and a layer arranged thereon made of at least one fibrous strip (6) wound in an overlapping manner, which is impregnated with a liquid reaction resin, with a base body (8), on which at least two guide mechanisms (10, 12) are accommodated, each comprising a continually circulating belt (14, 16), by means of which the inner film hose (4) is moved in a feed direction (A), is characterized in that the first guide mechanism (10) is coupled by fixed mounting to the base body (8), and in that the circulating belt (16) of the second guide mechanism (12) can be moved in a plane extending perpendicularly to the feed direction (A) and is forced away from the upper side of the base body (8) by means of pressing means (18; 118) with a preferably substantially constant force.

12 Claims, 5 Drawing Sheets

Figure 1:
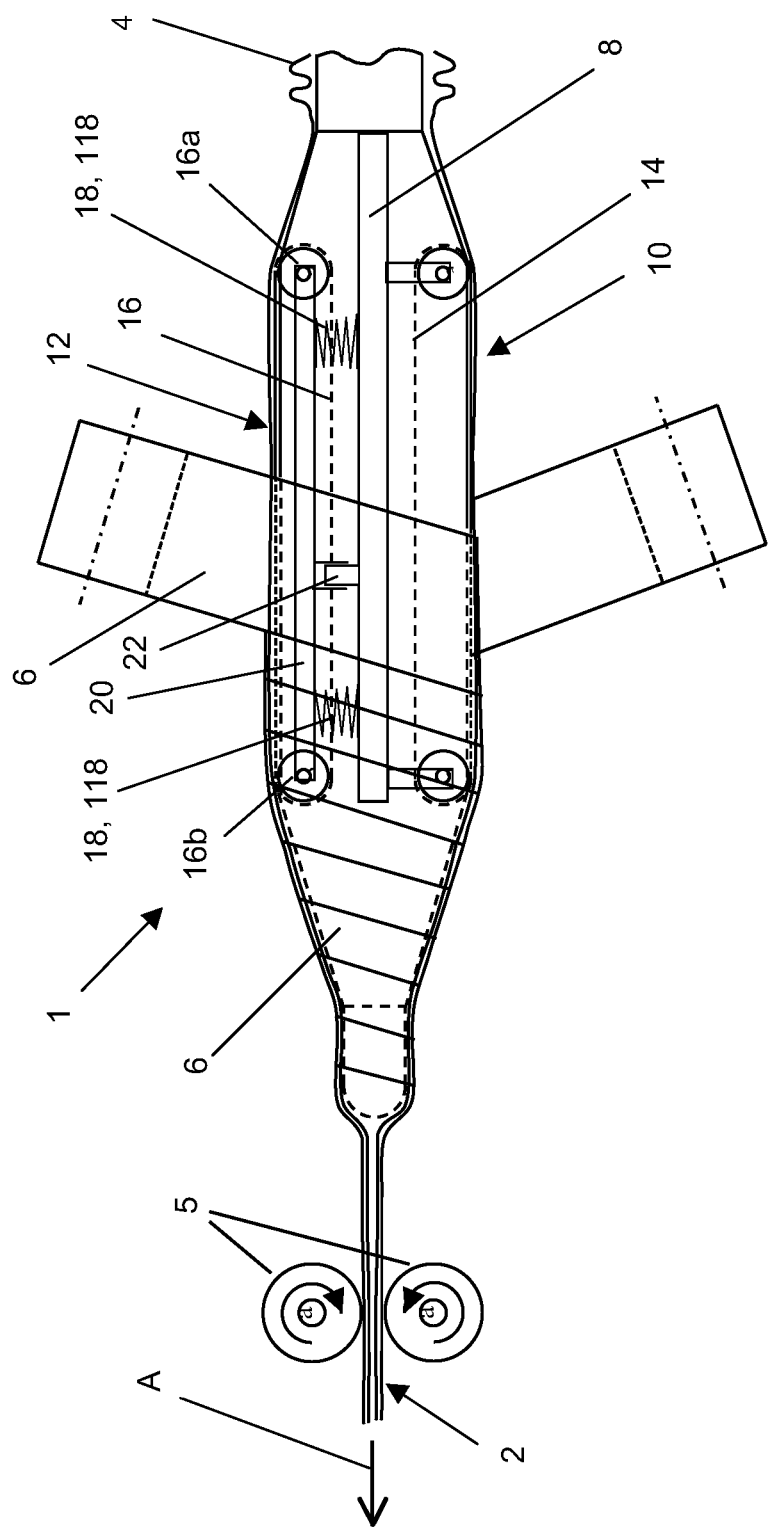

(51) Int. Cl.
  *B29C 33/44* (2006.01)
  *B29C 65/00* (2006.01)
  *F16L 55/165* (2006.01)
  *B29C 63/10* (2006.01)
  B29L 9/00 (2006.01)
  B29L 23/00 (2006.01)
  B29C 53/60 (2006.01)

(52) U.S. Cl.
  CPC .......... *B29C 63/10* (2013.01); *B29C 66/5326* (2013.01); *B29C 66/83* (2013.01); *B29C 66/922* (2013.01); *F16L 55/1654* (2013.01); *B29C 53/607* (2013.01); *B29L 2009/00* (2013.01); *B29L 2023/005* (2013.01)

(56) References Cited

U.S. PATENT DOCUMENTS

| | | | | |
|---|---|---|---|---|
| 3,627,615 A | * | 12/1971 | Guiles | B29C 53/50 138/DIG. 2 |
| 3,950,213 A | * | 4/1976 | Rejeski | B29C 53/50 156/461 |
| 4,054,474 A | * | 10/1977 | Collins, III | B29C 66/71 156/267 |
| 5,273,611 A | * | 12/1993 | Webb | F16L 58/1063 156/392 |
| 2013/0098495 A1 | * | 4/2013 | Fasel | F16L 11/08 138/125 |
| 2015/0068636 A1 | * | 3/2015 | Duttenhoefer | B32B 37/142 138/137 |

* cited by examiner

WINDING MANDREL IN A WINDING APPARATUS FOR PRODUCING A LINER HOSE FOR LINING CHANNELS AND PIPES

This application is based on and claims priority to German Patent Application No. DE 10 2015 014 729.3 filed on Nov. 17, 2015, the entire contents of which are incorporated herein by reference.

The invention relates to a winding mandrel in a winding apparatus for producing a liner hose for lining pipes.

For the trenchless renewal of damaged sewer pipes, liner hoses referred to as "inliners" are increasingly being used, which are made of a fibrous material, particularly fiberglass cloth impregnated with a liquid reaction resin; the liner hose is pulled into a pipe to be rehabilitated and then expanded using compressed air, after which the resin is cured using light from a radiation source.

A liner hose of this type along with a method and a device for producing such a hose are known, for example, from DE 198 23 714 C2.

The liner hose is produced by winding the resin-impregnated fibrous strips, overlapping one another, in a winding apparatus, onto an inner film hose which is permeable to UV light, and which has been pulled, for example, onto a cantilevered support tube, at the end of which a winding mandrel is located, over which the inner film hose is moved during the winding process. The winding mandrel has two or more guide mechanisms in the form of circulating belts, which can be moved in a radial direction relative to one another, in order to be able to adapt the diameter of the liner hose to a desired pipe diameter.

This results in the problem that the inner film hoses, which as a rule are fabricated without seams, on which the fibrous strips are wound, can have circumferential tolerances of up to ±14 mm, for example. However, the winding mandrel, over which the inner film hose is guided during the production of the liner hose, should be set in terms of the diameter thereof so that the hose film is guided neither too firmly nor too loosely on the circulating belt.

In this connection, an additional problem consists in that, in principle, the diameter of the winding mandrel can be adjusted only if the winding mandrel is exposed, i.e., before the start of production, but during the subsequent production the selected setting of the diameter can no longer be changed. Therefore, fabrication-caused tolerances in the film diameter lead to a more or less satisfactory adaptation of the winding mandrel to the actual film diameter. If the winding mandrel is larger than the film, the film is stretched excessively. If the winding mandrel is smaller than the film, the film does not sit sufficiently firmly and the film can shift.

In practice this leads to tensions being generated in the inner film hose, which sometimes lead to folds which have a disadvantageous effect on the strength of the liner hose after the curing in a pipe to be rehabilitated.

Accordingly, an aim of the present invention is to prevent mechanical stress differences and associated folds of the inner film hose, which are produced by fabrication-caused tolerances in the diameter of the film of the inner film hose during the fabrication of the liner hose.

This aim may be achieved according to one embodiment of the invention by means of a winding mandrel (1) in a winding apparatus for producing a liner hose (2) for the lining of channels or pipelines, which comprises an inner film hose (4) and a layer arranged thereon made of at least one fibrous strip (6) wound in an overlapping manner, which is impregnated with a liquid reaction resin, with a base body (8), on which at least two guide mechanisms (10, 12) are accommodated, each comprising a continually circulating belt (14, 16), by means of which the inner film hose (4) is moved in a feed direction (A), wherein the first guide mechanism (10) is coupled by fixed mounting to the base body (8), and in that the circulating belt (16) of the second guide mechanism (12) can be moved in a plane extending perpendicularly to the feed direction (A) and is forced away from an upper side of the base body (8) by means of a pressing means (18; 118) with a substantially constant force.

Additional features of the invention are contained in the dependent claims.

According to the invention, a belt of the winding mandrel is spring-mounted, or, in the case of large winding mandrels for liner hoses having standard diameters (DN) of more than 600 mm, two belts of the winding mandrel are spring-mounted. The tension on the inner film hose in radial direction, i.e., in a direction transverse to the feed direction, thus remains always substantially constant, even if the diameter of the inner film hose changes due to the fabrication. In other words, the diameter of the winding mandrel adjusts automatically during ongoing production, so that, in spite of the fabrication-caused tolerances in the diameter thereof, the film is always under substantially the same tension before as well as during the winding of the fibrous strips on the inner film hose.

As the applicant discovered in this connection, due to the compensation of the fabrication-caused changes in diameter, the diameter of the wound liner changes indeed to the same extent as the diameter of the film, but, in practice, such variations in the standard diameter (DN) of the liner do not present any problems during the placement and curing of same.

The spring mounting of the belt(s) can here occur in different ways, for example, by means of pressing means which are implemented as compressed air cylinders, preferably bellows cylinders, or as mechanical springs, for example, gas pressure springs or also spiral pressure springs, which have a comparatively small spring constant and which are prestressed in order to generate the required pressures for generating a substantially constant force that is as independent of the path as possible.

Below, the invention is described in reference to the drawing based on preferred embodiments.

Figure 2:
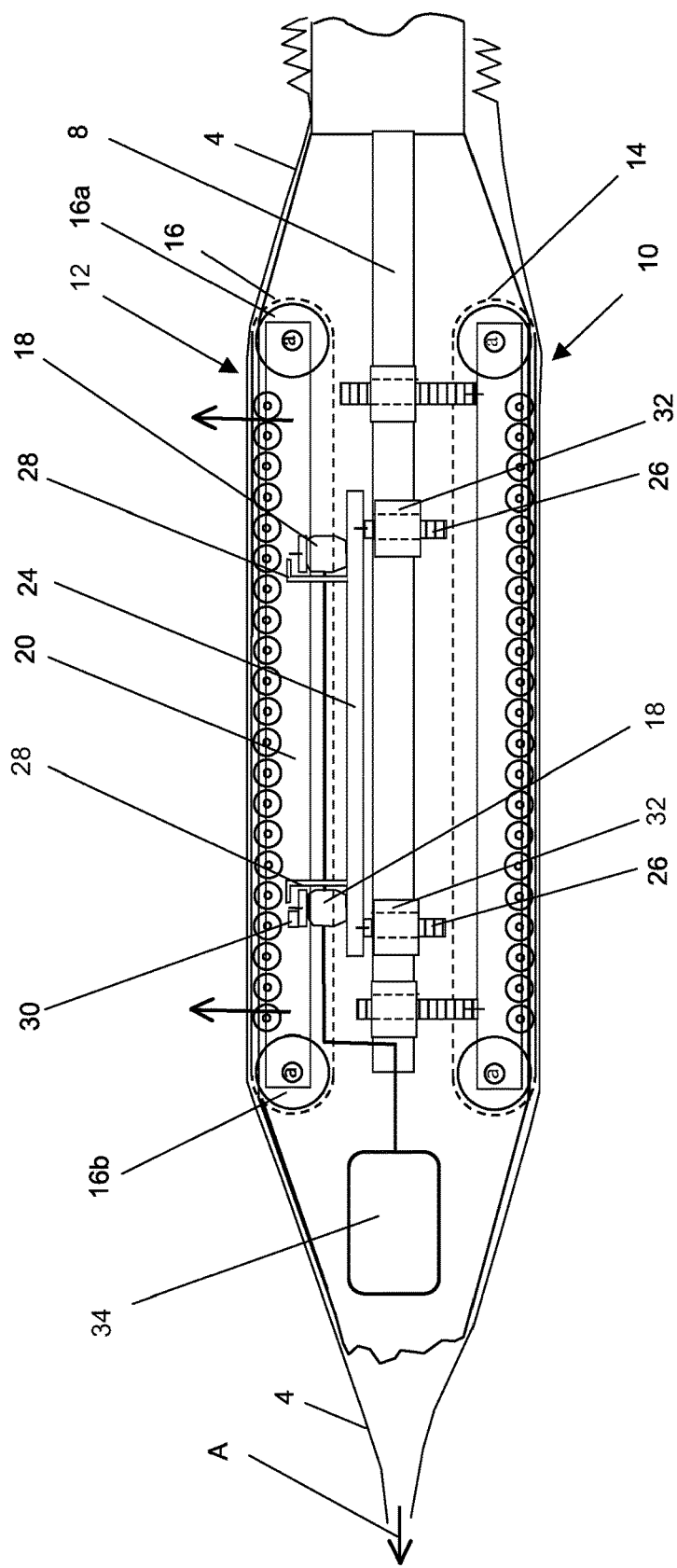
Figure 3:
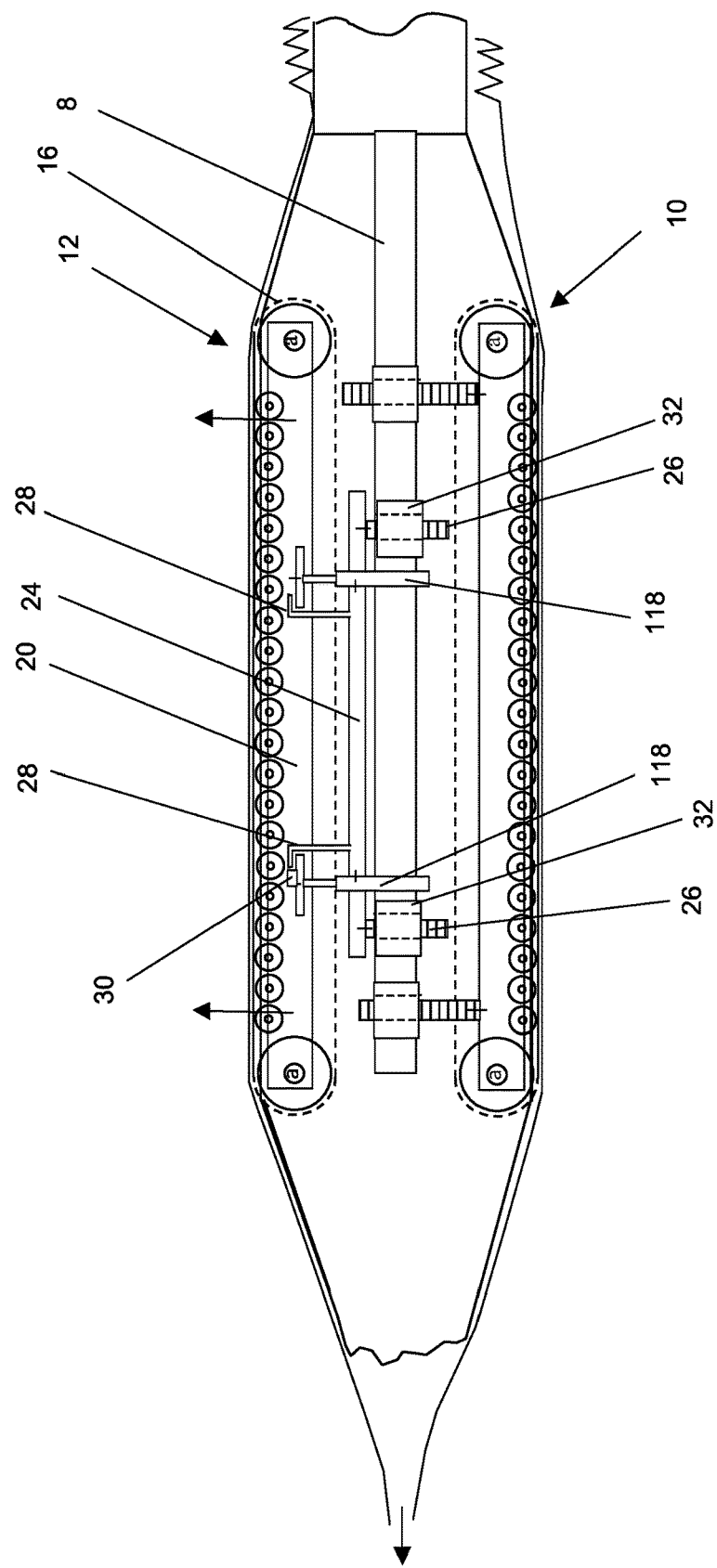
Figure 4:
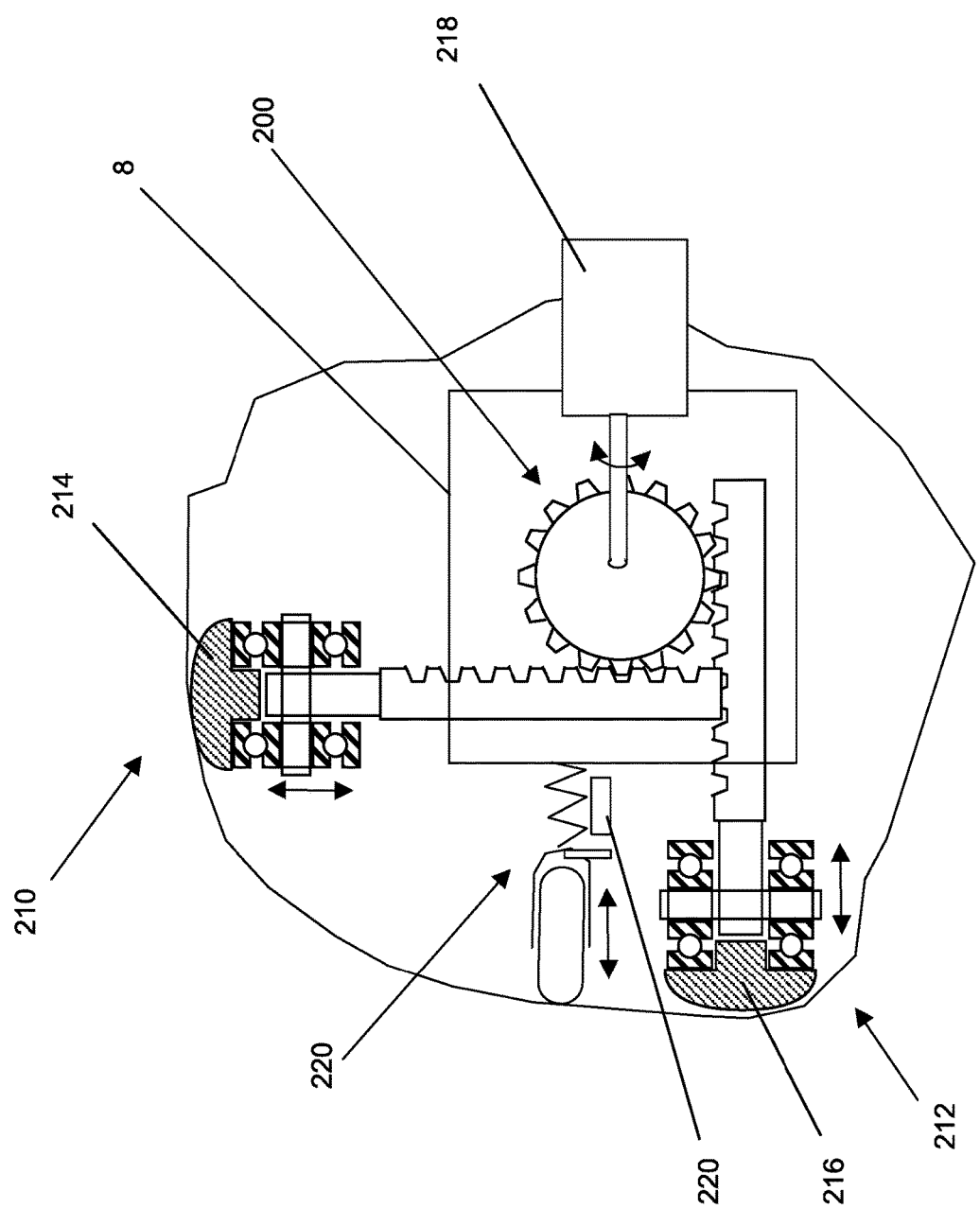
Figure 5:
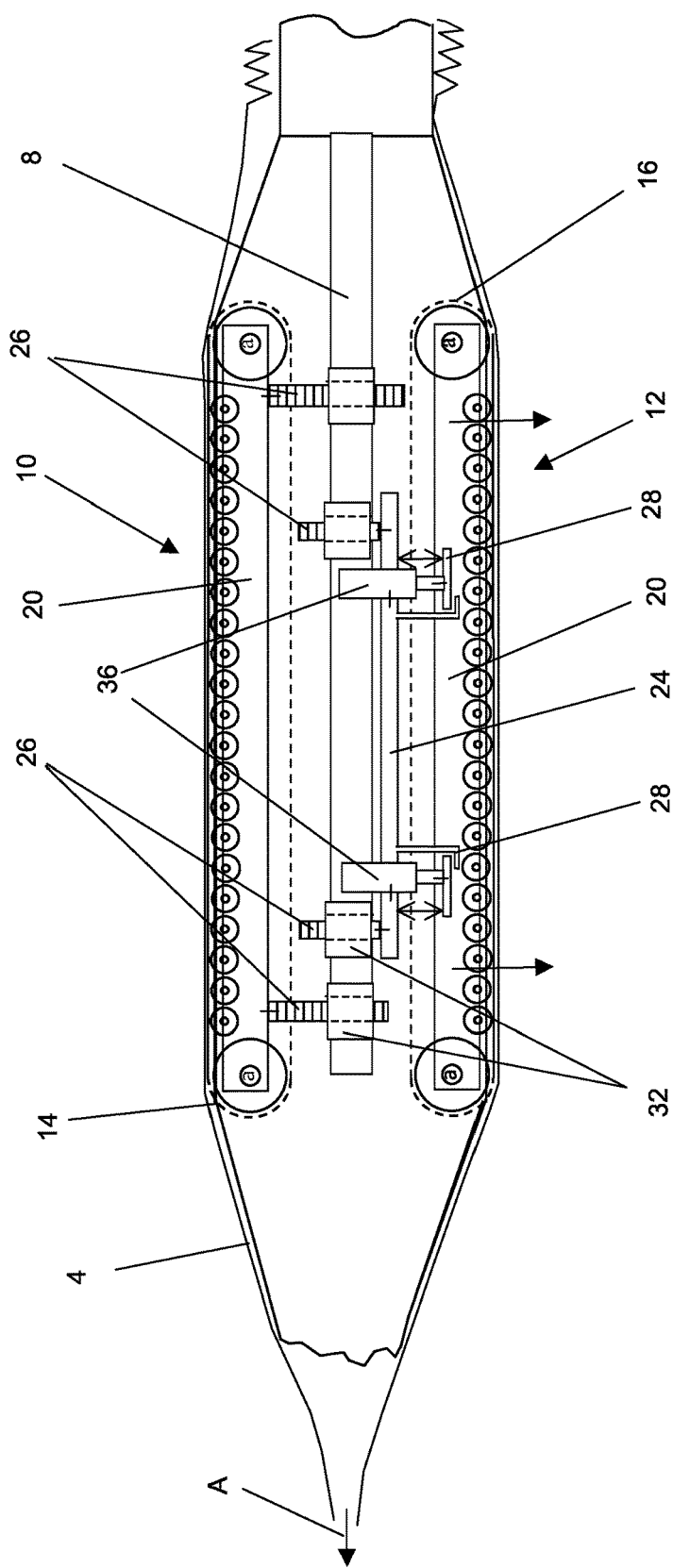

In the drawings:

FIG. 1 shows a diagrammatic side representation of a winding apparatus with a winding mandrel according to the invention during the production of a liner hose, FIG. 2 shows a diagrammatic detailed view of a first embodiment of the invention, in which the pressing means are designed as pneumatic spring elements which are connected to a compressed air source, FIG. 3 shows a diagrammatic detailed side view of a second embodiment of the invention, in which the pressing means are designed as gas pressure springs, FIG. 4 shows a diagrammatic representation of an additional embodiment of the invention, in which the pressing means are designed as an actuator which moves the belts jointly via a central adjustment device in radial direction as a function of the signals of a pressure sensor, in order to maintain the extensive tension in the inner film hose substantially constant during production, and FIG. 5 shows a diagrammatic representation of an additional embodiment of the invention, in which the force of the pressing means is provided by the weight of the second guide mechanism itself, which is accommodated on the base body in a movable and suspended manner.

As shown in FIG. 1, in a winding apparatus for the production of a liner hose 2 for lining channels and pipelines, a winding mandrel 1 comprises a base body 8, which is fastened to a preferably cantilevered support tube, which is not specified in further detail, and on which at least two guide mechanisms 10, 12 are accommodated, each comprising a continually circulating belt 14, 16. Via the belts 14, 16, which are driven preferably by a motor not shown in further detail, an inner film hose 4 is moved in a known manner by means of pulling rollers 5 in a feed direction A, on which at least one fibrous strip 6 impregnated with liquid reaction resin is wound in an overlapping manner by means of a circulating winding body, which is not shown in further detail for reasons having to do with the representation technique.

In the embodiments of the invention shown in FIGS. 1 to 3, the first guide mechanism 10 is coupled by fixed mounting to the base body 8, and the circulating belt 16 of the second guide mechanism 12 can be moved in a plane extending perpendicularly to the feed direction A and forced by means of the pressing means 18, 118 with a preferably substantially constant force away from the top side of the base body 8, in order to generate a tension that is as constant as possible in the inner film hose. By fixed mounting is understood here to mean that the respective elements are firmly connected to the base body 8 during production and cannot move in radial direction.

In this regard, in the embodiment of the invention shown in FIGS. 2 and 3, the continually circulating belt 16 of the second guide mechanism 12 is guided by means of a first and a second turning roller 16a, 16b, which are accommodated in a common support body 20, on which the pressing means 18, 118 act. In order to achieve thereby the smoothest possible circulation of the belts 14, 16, the latter can run on rollers, not specified in further detail, which are mounted so they can freely rotate on the support body 20 and preferably implemented as ball bearings.

In order to enable a movement of the common support body 20 with respect to the base body 8 in radial direction, i.e., away from the center of the base body 8, without moving the support body 20 with the belt accommodated thereon in longitudinal direction of the support body, a guide diagrammatically indicated in FIG. 1, in particular a linear guide 22, is preferably provided, which, for example, can comprise a rod-shaped element attached by fixed mounting, which is guided in a sleeve-shaped element which is attached, for example, to the support body 20 or formed in same, for example, in a through bore produced in the support body 20. As a result, the possibility is provided of driving the belt 16 of the second guide mechanism 12 in the same way as the belt 14 of the first guide mechanism 10 attached by fixed mounting, if desired by means of a drive motor that is not shown further.

As shown moreover in the representations of FIGS. 2 and 3, according to an additional embodiment of the invention, the support body 20 can be braced via the pressing means 18; 118 against a second base support body 24 which, for the adaptation of the diameter of the winding mandrel 1 to different standard diameters of the inner film hose 4, can be moved via an adjustment device 26, in particular by means of a central spindle drive actuated manually or by a motor in a direction extending perpendicular to the feed direction (A) of the liner hose 2 relative to the base body 8. This results in the advantage that the diameter of the winding mandrel according to the invention can be set before a production order to a new standard diameter in a minimum of time.

In the above-described embodiments of the invention, an abutment 28, which limits the movement of the support body 20 away from the outer side of the base body 8, can be associated with the support body 20—as shown in FIGS. 2 and 3. As a result, it is ensured that the belt 16 moves radially exclusively in a preferred movement range in which the pressing means generate a substantially constant pressure.

According to another idea underlying the invention, in the above-described embodiment, a limit switch and/or a position sensor 30 is associated with the abutment 28, upon the actuation of which a warning signal is issued and/or a control signal is generated, as a function of which an actuating drive 32, for example, an electrical actuating motor or a pneumatic cylinder, is activated, which, in particular, acts on the base support body 24, in order to move the first and the second guide mechanism 10, 12, and, in the case of winding mandrels of large diameter, also additional guide mechanisms, apart or together jointly relative to one another.

In the preferred embodiment of the invention shown in FIG. 2, the pressing means comprise at least a pneumatic spring element 18, in particular a bellows cylinder or a compressed air cylinder, which is connected to a compressed air source 34 which is arranged preferably in the interior of the base body 8. Here, preferably several such pneumatic spring elements 18 are arranged over the length of the base body 8, of which, for the sake of simplicity, only two elements are shown in FIG. 2. By increasing or lowering the air pressure in the compressed air source 34, which, in the simplest case, can occur via a valve that is not represented in further detail, and via a compressed air compressor, the pressure exerted by the bellows cylinder, or the compressed air cylinder 18, on the circulating belt 16 of the second guide mechanism 12 can be increased or lowered to a desired value.

In order to increase or lower the pressure on the inner film hose 4 if needed also subsequently, during the ongoing production, for example, in order to compensate for temperature variations in the production site, a heating device, in particular an electrical heating device, for example, an ohmic resistance heater, is arranged preferably in the compressed air source 34, by means of which the temperature of the compressed air stored in the compressed air source 34 can be changed. In the case of an electrical heating device, the temperature can furthermore be regulated by means of a temperature regulation device, which is not shown in further detail, to a constant value, so that the pressure—and thus the tension of the inner film hose 4 in circumferential direction—always has a predetermined, well defined magnitude during the ongoing production.

According to an additional embodiment of the invention, which is particularly suitable for use in winding mandrels that are actuated purely mechanically and not driven, the pressing means comprise at least one mechanical spring 118, which has a spring characteristic curve that is substantially independent of the path. Such a pressure can be achieved, for example, by a gas pressure spring, a cup spring, or a strongly prestressed spiral spring with a comparatively low spring constant, wherein, in this case, it must be assumed that the pressure is only substantially constant, since the aforementioned mechanical springs in practice always have a certain dependency on path.

According to an additional idea underlying the invention, the substantially constant pressure on the second belt 16 can be generated in that the second guide mechanism 12 is accommodated in a linear guide or else a swivel guide—as indicated in FIG. 5—suspended from the bottom side of the base body 8. The substantially constant pressure of the pressing means is generated here by the weight of the second guide mechanism 12 itself, which can be increased or lowered by removing or adding extra weights.

In the last-described embodiment as well as in the embodiments of the invention described previously, it is moreover advantageous if the movement of the belt 16 of the second guide mechanism 12 is damped by a damping element 36 acting between the base body 8 and the second guide mechanism 12. In the embodiment of the invention shown in FIG. 5, the damping element comprises an oil pressure shock absorber or a gas pressure shock absorber 36, for example, in the simplest case, an air bellows provided with openings, which is preferably fastened at an end thereof to the base support body 24 and at the other end thereof to the support body 20.

Finally, according to an additional alternative embodiment of the invention, a first and second guide mechanism 210, 212 can be accommodated on the base body 8 of the winding mandrel 1, which are both mechanically coupled to one another via a central adjustment device 200 which is accommodated on the base body 8 and moves the belts 214, 216 of the first and second guide mechanism 210, 212 jointly by the same movement path in a radial direction away from or towards the surface of the base body 8, as shown in FIG. 4. In this embodiment, the pressing means comprise an actuator 218, for example, an electric motor and a corresponding transmission, or a pneumatic or hydraulic cylinder, which actuates the central adjustment device 200, which is represented symbolically by a central toothed wheel and toothed rods engaging in said toothed wheel, as a function of the signals of a pressure sensor 220, so that the two belts 214, 216 of the guide mechanisms 210, 212 are pressed with a substantially constant pressure against the inner side of the inner film hose 4. Here, the pressure sensor 220 can be, for example, a spring-loaded rotor contacting the inner side of the inner film hose 4 or a spring-loaded sliding finger, which—as shown—can be attached to the base body 8 or else to the support body 20 of a guide mechanism 210, 212, and the deflection of which is detected by means of an electronic measuring transducer. As a function of the signals of the pressure sensor 220, the actuator 218 is activated during ongoing production in such a manner that the adjustment device 200 moves the first and second guide mechanism 210, 212 radially inward if the deflection of the pressure sensor 220 is too small, and vice versa. The supply of the electrically activated components such as, for example, the actuator and the pressure sensor, as well as optionally also the control electronics accommodated in the interior of the winding mandrel 1 can here advantageously occur via an accumulator battery or else via an inductive coupling of the electrical energy from outside.

LIST OF REFERENCE NUMERALS

1 Winding mandrel
2 Liner hose
4 Inner film hose
5 Pulling roller
6 Fibrous strip
8 Base body
10 First guide mechanism
12 Second guide mechanism
14 Belt of the first guide mechanism
16 Belt of the second guide mechanism
16a First turning roller
16b Second turning roller
18 Pressing means
20 Support body
22 Guide
24 Base support body
26 Adjustment device for changing the standard diameter
28 Abutment
30 Position sensor
32 Actuating drive
34 Compressed air source
36 Damping element
118 Mechanical spring
200 Adjustment for moving the guide mechanisms apart jointly
210 First guide mechanism of the embodiment of FIG. 4
212 Second guide mechanism of the embodiment of FIG. 4
214 First belt
216 Second belt
218 Actuator
220 Pressure sensor
A Feed direction

The invention claimed is:

1. A winding mandrel (1) in a winding apparatus for producing a liner hose (2) for the lining of channels or pipelines, which comprises an inner film hose (4) and a layer arranged thereon made of at least one fibrous strip (6) wound in an overlapping manner, which is impregnated with a liquid reaction resin, comprising: a base body (8) accommodating at least a first guide mechanism (10) and a second guide mechanism (12), each guide mechanism having a continually circulating belt (14, 16), by means of which the inner film hose (4) is moved in a feed direction (A), wherein the first guide mechanism (10) is coupled by fixed mounting to the base body (8), and in that the circulating belt (16) of the second guide mechanism (12) can be moved in a plane extending perpendicularly to the feed direction (A) and is forced away from an upper side of the base body (8) by a pressing means (18; 118) with a substantially constant force.

2. The winding mandrel according to claim 1, wherein the continually circulating belt (16) of the second guide mechanism (12) is guided over a first and a second turning roller (16a, 16b), which are accommodated on a common support body (20), on which the pressing means (18; 118) act.

3. The winding mandrel according to claim 2, wherein the common support body (20) is guided movably in a radial direction with respect to the base body (8) in a guide (22).

4. The winding mandrel according to claim 3, wherein the common support body (20) is braced via the pressing means (18; 118) against a second base support body (24), which, for the adaptation of the diameter of the winding mandrel (1) to different standard diameters of the inner film hose (4), can be moved via an adjustment device (26), in a direction extending perpendicularly to the feed direction (A) of the liner hose (2), relative to the base body (8).

5. The winding mandrel according to claim 4, wherein an abutment (28), which limits the movement of the support body (20) away from an outer side of the base body (8), is associated with the support body (20).

6. The winding mandrel according to claim 5, wherein at least one of a limit switch or a position sensor (30) is associated with the abutment (28), upon the actuation of which at least one of a warning signal is issued or a control signal is generated, as a function of which an actuating drive (32) is activated for moving the first and second guide mechanisms (10, 12) or additional guide mechanisms apart or towards one another.

7. The winding mandrel according to any one of the preceding claims, wherein the pressing means comprise at least one pneumatic spring element (18), which can be connected to a compressed air source (34) arranged in the interior of the base body (8).

8. The winding mandrel according to claim 7, wherein a heating device, by means of which the temperature of the compressed air stored in the compressed air source (34) can be changed, is associated with the compressed air source (34).

9. The winding mandrel according to claim 6, wherein the pressing means comprise at least one mechanical spring (118) with a substantially path-independent spring characteristic curve, comprising at least one of a gas pressure spring, a cup spring or a prestressed spiral spring.

10. The winding mandrel according to claim 5, wherein the second guide mechanism (12) is suspended from a bottom side of the base body (8), and the substantially constant force of the pressing means is provided by the weight of the second guide mechanism (12).

11. The winding mandrel according to claim 10, wherein a damping element (36) for the damping of the movement of the second guide mechanism (12) is provided and acts between the base body (8) and the second guide mechanism (12).

12. A winding mandrel (1) in a winding apparatus for producing a liner hose (2) for lining channels or pipelines, which comprises an inner film hose (4), and a layer arranged thereon made of at least one fibrous strip (6) wound in an overlapping manner, and which is impregnated with a liquid reaction resin, comprising: a base body (8), accommodating at least a first guide mechanisms and a second guide mechanism (210, 212), each guide mechanism having a continually circulating belt (214, 216) by means of which the inner film hose (4) is moved in a feed direction (A), wherein the first guide mechanism and the second guide mechanism (210, 212) are coupled mechanically to one another via a central adjustment device (200) which is accommodated on the base body (8) and which moves the belts (214, 216) of the first and second guide mechanisms (210, 212) jointly by the same path distance in a radial direction away from a surface of the base body (8), and in that a pressing means comprises an actuator (218) which actuates the central adjustment device (200) as a function of a signal of a pressure sensor (220) contacting the inner film hose (4), in such a manner that the two belts (214, 216) of the guide mechanisms (210, 212) are pressed with a substantially constant pressure of equal magnitude against an inner side of the inner film hose (4).

* * * * *